United States Patent [19]
Pascor

[11] Patent Number: 5,180,124
[45] Date of Patent: Jan. 19, 1993

[54] ARTICULATED CLAMP FOR FASTENING PIPES

[75] Inventor: Michel Pascor, Orleans, France

[73] Assignee: Equipments Speciaux Pour l'Aviation (ESPA), Brie-Comte Robert, France

[21] Appl. No.: 825,678

[22] Filed: Jan. 27, 1992

[30] Foreign Application Priority Data

Feb. 8, 1991 [FR] France .................. 91 01482

[51] Int. Cl.[5] .............................................. F16C 3/08
[52] U.S. Cl. ........................ 248/74.4; 248/74.1; 248/316.5
[58] Field of Search ............. 248/74.1–74.5, 248/73, 316.5, 62

[56] References Cited

U.S. PATENT DOCUMENTS

Re. 22,824 12/1946 Morehouse .................. 248/74.3
4,858,861 8/1989 Wilkinson .

FOREIGN PATENT DOCUMENTS 2162662 6/1973 Fed. Rep. of Germany .
2500571 2/1982 France .

Primary Examiner—Alvin C. Chin-Shue
Attorney, Agent, or Firm—Robbins, Dalgarn, Beriner & Carson

[57] ABSTRACT

Clamp for fastening cylindrical elements, particularly pipes (11), comprising a frame in two parts (1, 2), articulated one with respect to the other and a flexible protective strip (10) inserted between the frame and the pipe to be fastened. The articulation is produced by means of an angle (8) of one part (2) of the frame and by means of a slot made in the other part (1) of the frame of the clamp.

8 Claims, 1 Drawing Sheet

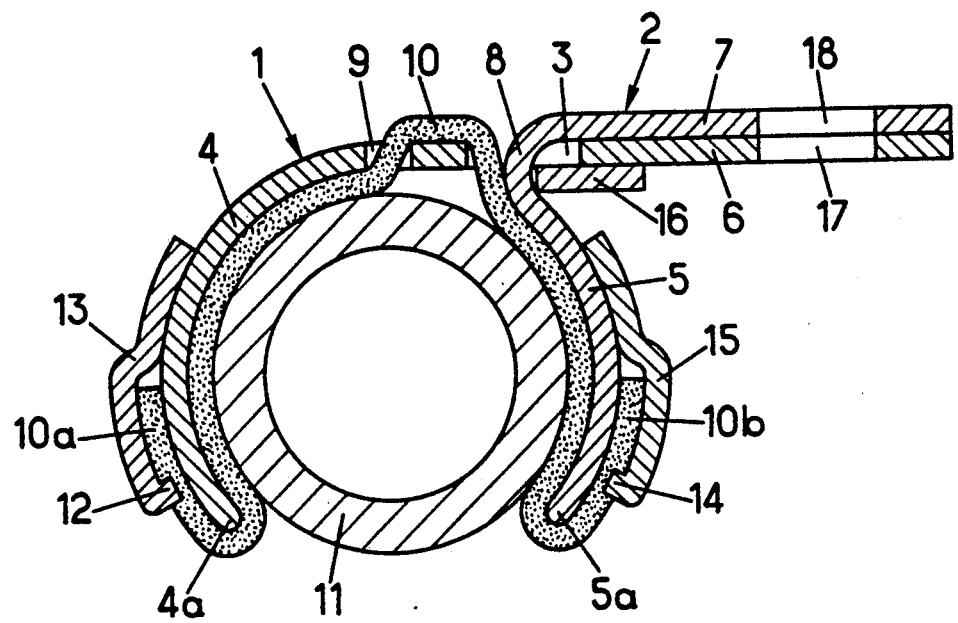
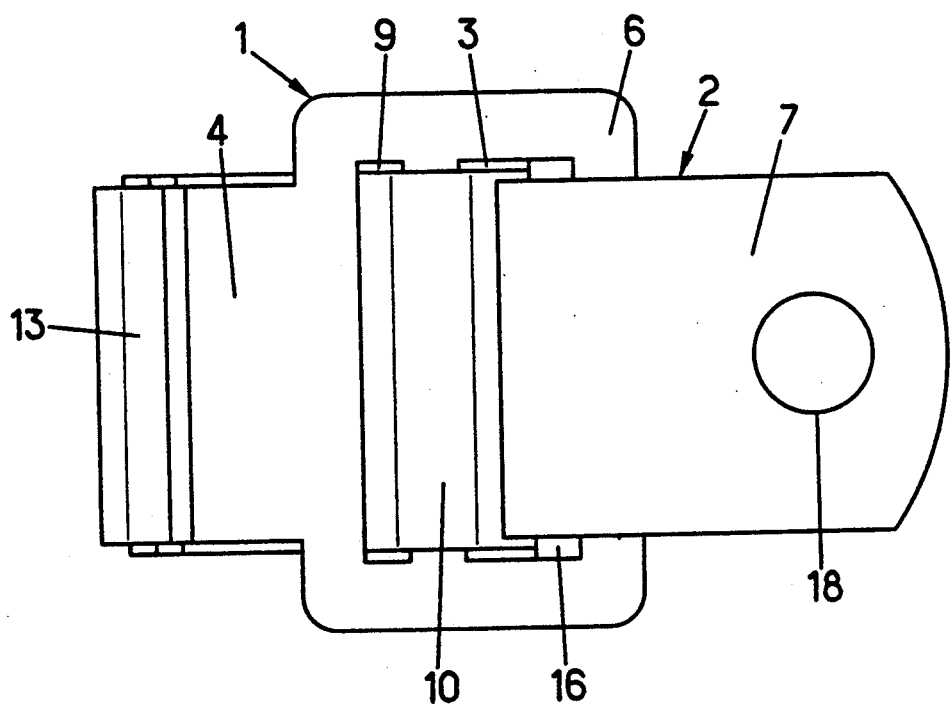

ARTICULATED CLAMP FOR FASTENING PIPES present invention relates to a clamp for fastening cylindrical elements, particularly flexible or rigid pipes onto a fixed support.

The clamps currently used in the automobile or aviation industry comprise an annular part which comes to grip the pipe, and a part forming a branch for fastening which generally cooperates with a screw-nut system with a view to fastening onto a fixed support.

Clamps of this type present practical difficulties during use, it being necessary first to mount the clamps onto the pipe to be fastened, before these clamps can be fastened onto the support. Similarly, replacement of pipes necessitates complete removal of the clamps, which involves a relatively long intervention time.

Moreover, the clamps known hitherto surround the pipe completely. In the case where the pipe longitudinally comprises holes at regular intervals so as to diffuse a fluid to the outside, as is the case for example for the diffusion of air for cooling an engine, conventional clamps are not well adapted, because it is necessary to position them accurately, on the one hand on the fixed support for their mounting, and on the other hand on the pipe so that they do not close off the holes of the pipe.

The object of the present invention is to remedy the disadvantages of conventional clamps by constructing an open articulated clamp, the use of which is simple and rapid.

The fastening clamp according to the invention may be used in order to fasten any element of cylindrical shape, in particular pipes. The clamp comprises a frame in two parts articulated one with respect to the other, both having a straight part provided with a perforation and a circular part intended to grip the pipe. In gripping position, the two circular parts form a substantially cylindrical space of an arc which is not closed on itself, the two straight parts then being superimposed on one another with the respective perforations aligned. In order to produce the articulation of the two parts, one of them is provided with a slot on its straight part making it possible to receive the second part which has an angled portion between the circular part and the straight part.

Preferably, the fastening clamp is provided with a protective strip inserted between the inner wall of the circular parts of the frame and the pipe. To this end and in an advantageous manner, each of the circular parts of the frame comprises at its outer wall a toothed element fixing an end of the protective strip, the said strip passing around the free end of each circular part so as to be located in the space included between the said circular parts and the pipe.

The invention will be better understood by studying the detailed description of an embodiment of the invention, which constitutes a non-limitative example and is shown in the accompanying figures, in which:

FIG. 1 is a radial sectional view of the fastening clamp according to the invention, and FIG. 2 is a plan view of the clamp of FIG. 1.

As shown in the figures, the fastening clamp comprises a frame consisting of a first part 1 and of a second part 2, articulated one with respect to the other through a slot 3 of the first part 1. The parts 1 and 2 of the frame each have a substantially circular part 4, 5 and a straight part 6, 7. The straight part 6 of the first part 1 is a substantially tangential extension of the circular part 4. The straight part 7 of the second part 2 is angled in the opposite direction to the curvature of the corresponding circular part 5. The angle 8 thus formed is located at the level of the articulation slot 3.

As can be seen more clearly in FIG. 2, the straight part 6 of the first part 1 has a portion of width greater than the width of the rest of the clamp so as physically to construct the articulation slot 3 which ensures the passage of the second part 2. Parallel to the articulation slot 3, the first part 1 comprises a second slot 9 of length substantially identical to that of the articulation slot 3, so as to permit the passage of a protective strip 10.

The protective strip 10 has a width comparable with that of the clamp and serves to protect the pipe 11 from vibrations and from temperature. The protective strip 10 may be constructed by means of a flexible material, such as rubber or a ceramic braid.

The protective strip 10 is associated with the frame in the following manner: starting from an end part 10a of the strip 10, this part 10a finds itself blocked between the outer wall of the circular part 4 of the first part 1 and claws 12 of a retaining element 13 rendered integral with the first part 1 of the frame, by means of, for example, welding. The first end part 10a being fastened, the protective strip 10 passes around the free end 4a of the circular part 4 of the first part 1 so as to face the inner wall of this part 4. The strip 10 then forms a loop by passing firstly through the second slot 9 towards the outside and then through the articulation slot 3 towards the inside of the clamp. Next, the strip 10 runs along the inner wall of the circular part 5 of the second part 2 of the frame and passes around the free end 5a of the latter so as to be blocked, at its second end part 10b, at the outer wall of the circular part 5 by claws 14 of a retaining element 15 which is rendered integral with the circular part 5 by means of, for example, welding.

In order to improve the articulation between the parts 1 and 2 of the frame on the one hand and to prevent any inadvertent dismounting of the two parts through the articulation slot 3, there is provided a tab 16 rendered integral with the side of the straight part 6 of the first part 1, located opposite the straight part 7 of the second part 2. The tab 16 partially closes the articulation slot 3 so that the articulation of the second part 2 with respect to the first part 1 is performed by means of the angle 8 of the second part around the tab 16.

The straight parts 6 and 7 of the first and second parts 1 and 2 of the frame each comprise a perforation 17, 18 intended to receive a fastening means, such as a screw-nut system, not shown, in order to fasten the clamp onto a fixed support, not shown.

The functioning of the clamp of the invention is as follows: in order to fasten the clamp, firstly a screw for example is inserted into the perforations 17, 18 of the first and second parts 1 and 2 of the frame, and it is screwed partially into the fixed support. At that moment, the two straight parts 6, 7 of the two parts 1 and 2 of the frame are not contiguous. In other words the straight part 7 of the second part 2 of the frame forms an angle with the straight part 6 of the first part 1, this corresponding to a separation of the circular part 5 of the second part 2 with respect to the circular part 4 of the first part 1. Thus the pipe 11 may easily be inserted into the clamp between the circular parts 4 and 5 of the frame. In tightening the screw, not shown, the two straight parts 6 and 7 of the frame are brought together and owing to the articulation of the two parts 1 and 2 of the frame, the two circular parts 4, 5 are brought together. Thus, at the same time, the fastening of the clamp onto the fixed support, not shown, and the locking of the pipe 11 between the circular parts 4 and 5 of the frame are ensured.

Preferably, the respective ends 4a, 5a of the circular parts 4 and 5 of the frame, in the position of gripping the pipe 11, are distanced from one another so as to leave visible a part of the pipe which represents about a quarter of the circumference. This embodiment is particularly advantageous in the case where the pipe possesses holes in order to diffuse a fluid. It is sufficient in fact to orientate the clamp with respect to the pipe so that the holes are located on the part of the pipe which is disengaged, that is to say not gripped by the clamp. Thus it is no longer necessary to take special precautions regarding the longitudinal positioning of the clamp with respect to the holes in the pipe.

I claim:

1. Clamp for fastening cylindrical elements, particularly pipes (11), comprising a frame in two parts, the first (1) of which has a first slot (3), and the second (2), has an angle (8), the first and second parts being articulated, one with respect to the other at the level of the first slot and of the angle, characterised in that it further comprises a flexible protective strip (10) inserted between the two parts of the frame and the pipe (11), and that the first part (1) is provided with a second slot (9), the protective strip forming a loop on the outside of the frame by passing through the said first and second slots.

2. Clamp according to claim 1, characterised in that the parts (1, 2) of the frame each have a circular part (4, 5) and a straight part (6, 7) provided with a perforation (17, 18), and that in gripping position, the two straight parts of the frame are superimposed with the perforations aligned, whereas free ends (4a, 5a) of the circular parts of the frame do not meet.

3. Clamp according to claim 2, characterised in that it comprises two retaining elements (13, 15) rendered integral with the outer wall of the circular parts (4, 5) of the frame and forming claws therewith, and fastening both ends (10a, 10b) of the protective strip (10) by means of the claws (12, 14).

4. Clamp according to claim 2 characterised in that the straight part (6) of the first part (1) of the frame has a portion wider than the width of the rest of the clamp, so that the first and second slots (3, 9) can have a length which is greater than the width of the second part (2) of the frame on the one hand and than the width of the protective strip (10) on the other hand.

5. Clamp according to clamp 2, characterised in that the frame further comprises a tab (16) rendered integral with one side of the straight part (6) of the first part (1) of the frame, located opposite the straight part (7) of the second part (2) of the frame and partially closing the first slot (3) of the first part of the frame.

6. Clamp according to claim 3, characterised in that the straight part (6) of the first part (1) of the frame has a portion wider than the width of the rest of the clamp, so that the first and second slots (3, 9) can have a length which is greater than the width of the second part (2) of the frame on the one hand and than the width of the protective strip (10) on the other hand.

7. Clamp according to claim 3, characterised in that the frame further comprises a tab (16) rendered integral with one side of the straight part (6) of the first part (1) of the frame, located opposite the straight part (7) of the second part (2) of the frame and partially closing the first slot (3) of the first part of the frame.

8. Clamp according to claim 4, characterised in that the frame further comprises a tab (16) rendered integral with one side of the straight part (6) of the first part (1) of the frame, located opposite the straight part (7) of the second part (2) of the frame and partially closing the first slot (3) of the first part of the frame.

* * * * *